March 17, 1931. H. E. BOYRIE 1,796,434
FLUID SEPARATOR
Filed Jan. 2, 1925

INVENTOR.
Harry E. Boyrie
BY E. J. Andrews
ATTORNEY.

Patented Mar. 17, 1931

1,796,434

UNITED STATES PATENT OFFICE

HARRY E. BOYRIE, OF SAN FRANCISCO, CALIFORNIA, ASSIGNOR, BY MESNE ASSIGNMENTS, TO BLAW-KNOX COMPANY, OF BLAWNOX, PENNSYLVANIA, A CORPORATION OF NEW JERSEY

FLUID SEPARATOR

Application filed January 2, 1925. Serial No. 261.

This invention relates to improvements in fluid separators and has for its object increasing the efficiency and the capacity of such apparatus. These objects are produced by more effectively distributing the steam as it passes through the separator so that the steam will pass through all portions of the separator at substantially the same rate. Thus the capacity as well as the effectiveness of the separator is increased.

Figure 1:
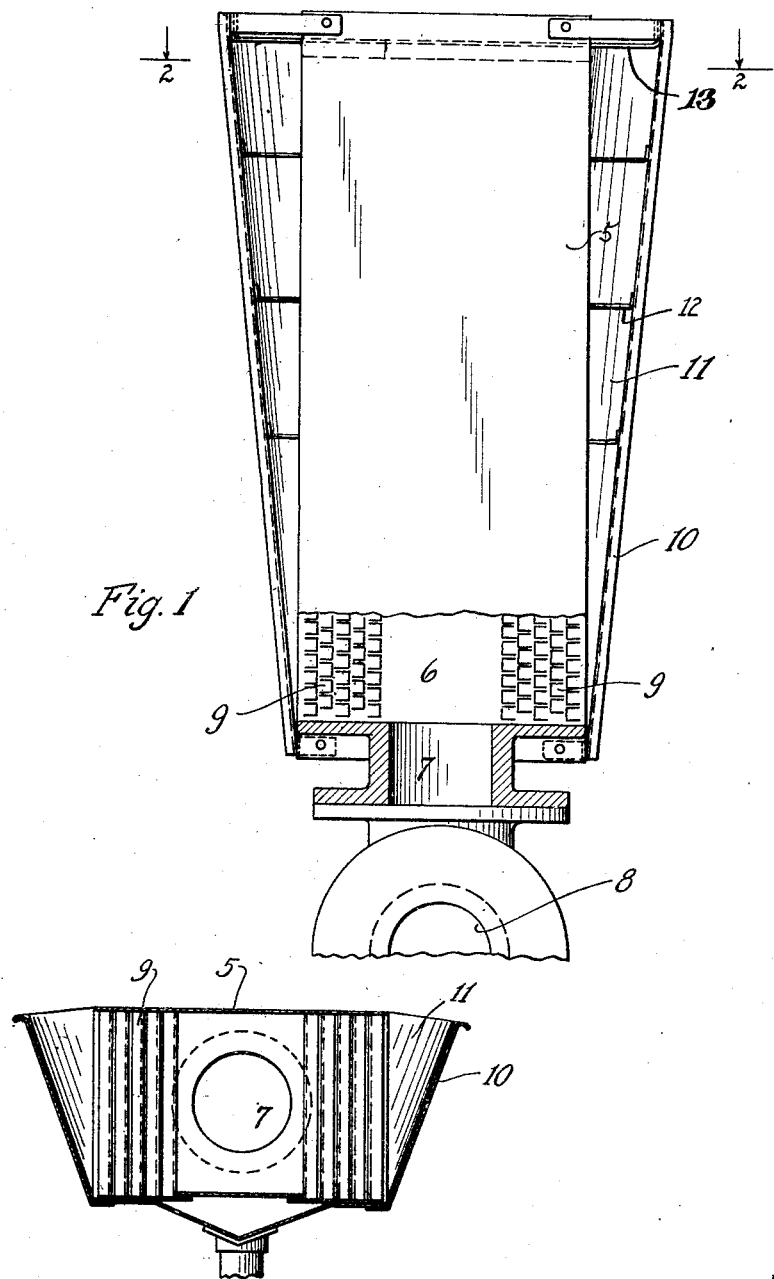
Figure 2:
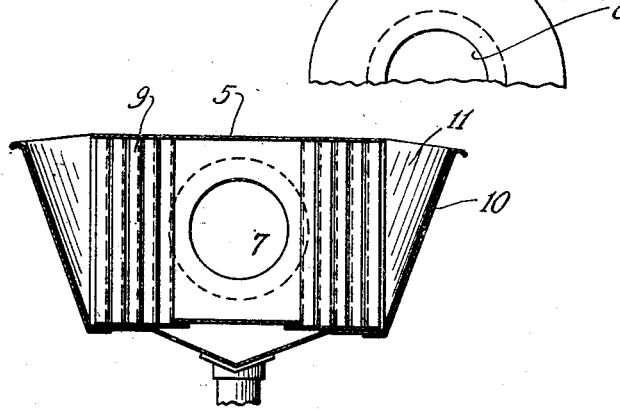

Of the accompanying drawings Fig. 1 is a plan view partly broken away of a fluid separator which embodies the features of my invention; and Fig. 2 is a transverse sectional view along the line 2—2 of Fig. 1.

The particular separator which I have illustrated and described herein is an improvement on the separator disclosed by the Patent No. 1,381,767 issued to Hayden H. Tracy on June 14, 1921. It is to be understood, however, that the invention is applicable to other types of separators and to separators for drying and purifying other gases as well as steam. I have found that in the use of the Tracy separator set forth in said patent that inasmuch as the steam passes out of one end only of the separator, there is a decided tendency for the steam in passing through the separator baffles to crowd towards the outlet end, so that the steam is not distributed through the baffles so as to produce the best result. If the speed of the steam through the baffles is too great the separation of the moisture from the steam will be imperfect as there is more or less tendency for the moisture, owing to spattering or otherwise, to be carried along with the steam. On the other hand if the speed of the steam is too slow the capacity of the separator will be unnecessarily diminished. Hence, in order to properly distribute the steam through the separator so as to have the rate of flow at all points suitable and also to have all portions of the baffles working at substantially full capacity, I provide means for obstructing the flow of steam into the separator more and more as the outlet of the separator is approached.

The separator comprises a casing 5 which has an inner chamber 6 and an outlet 7 connected with the outlet 8 of the boiler. And at each side of the chamber 6 are cartons of baffles 9. As is well understood, as the steam flows through these baffles the steam is dried and the impurities are removed therefrom. In this particular separator a baffle plate 10 in the shape of a warped surface is placed outside of the carton of baffles so as to prevent moisture from being carried into the baffles with the steam, and the steam passes upwardly and over this plate into the opening or slot 11, and thence into the baffles. In the said Tracy patent this slot is shown uniform from one end of the separator to the other. But in order to properly distribute the steam through the separator I position the plates 10 on each side so as to provide a tapering steam inlet or slot 11, as indicated in Fig. 1, with the slot becoming narrower as the outlet of the separator is approached. In this way there is more resistance to the flow of steam into the separator as the outlet is approached, and this decreases accordingly the rate of flow towards that end of the separator. If the taper of the slot with reference to the length and capacity of the separator is properly designed the flow through all portions of the baffles of the separator will be substantially uniform. In order to prevent flow of the steam in the inlet 11, towards the outlet end, baffles 12 may be inserted in the inlet, thus forcing the steam in each compartment, formed by these baffles and the plate 10, to pass directly into the separator baffles.

While other means might be employed for controlling the rate of flow into the separator yet I prefer the tapering slot 11 for the reason that it produces no eddy currents and provides a continuous and uniform increase in the resistance to the flow from one end of the separator to the other. Furthermore, I prefer the resistance to the flow to be placed outside of the baffles rather than inside for the reason that the capacity of the separator is thus increased, particularly the capacity of the inner steam chamber 6, and the pressure drop of the steam passing through it is decreased.

I claim as my invention:

1. A gas purifier comprising a casing having an inner passageway and a gas inlet, means for purifying the gas mounted between said inlet and passageway, said purifier having a gas outlet, the inlet of said purifier comprising an enlongated slot which is narrower at one end than at the other, and transverse baffles mounted between said slot and said purifying means.

2. A gas purifier comprising a casing having an inner chamber and a gas inlet, means for purifying the gas mounted between said inlet and chamber, said purifier having a gas outlet, the inlet of said purifier comprising an elongated opening which is narrower at one end than at the other, and transverse baffles mounted to extend between said inlet and said purifying means.

3. A steam purifier comprising an elongated casing, a carton of baffles mounted on one of the side walls of said casing, an inner chamber in said casing connecting with the said baffles and having an outlet at one end, a plate fixed to said purifier outside of said carton of baffles, one end of said plate being spaced from said baffles materially farther than the other end, and transverse plates extending from the inner portion of said first mentioned plate to said carton.

4. A steam separator comprising a hollow casing, steam separating baffles forming the side of said casing, a steam outlet fixed to one end of said separator, and a plate mounted outside of said baffles, the lower edge of said plate being in contact with the bottom of said separator, and the upper edge being inclined outwardly from the top edge of said separator, the upper portion of the end of said plate which is most remote from the outlet being spaced farther from the casing than the lower end portion, and said separator having a tapering opening between said upper edge and said casing.

5. A steam purifier comprising an elongated casing, a carton of baffles forming the side wall of said casing, an inner chamber in said casing connecting with the said baffles and having an outlet at one end, a plate fixed to said purifier by one end and one side edge outside of said carton of baffles, the remainder of said plate being spaced away from said baffles, and a second plate connecting the other end of said plate with said casing and extending from the bottom to the top of said first mentioned plate, said plates thus forming a tapering opening between said plates and said casing.

6. A steam separator comprising a hollow casing, steam separating baffles forming the side of said casing, a steam outlet connecting to one end of said casing, a plate fixed to said casing outside of said baffles and extending the full length thereof, the lower edge and one end of said plate being fixed to and in contact with the bottom and end of said casing, and a portion of the upper edge and the other end of the plate being spaced away from said casing and baffles, a tapering opening being thus formed between said upper edge and said casing.

7. A gas purifier adapted to be mounted in a gas generator, said purifier comprising a casing having an inner chamber, a gas inlet and a gas outlet, means for purifying gas mounted in said casing between the inlet and the chamber, said inlet comprising an elongated opening between the edges of which the gas can pass from said generator into said casing, the edges of said opening being closer together at one end that at the other.

8. A gas purifier as claimed in claim 7, in which the said outlet communicates with said chamber and said opening is narrower as the outlet is approached.

In testimony whereof, I hereunto set my hand.

HARRY E. BOYRIE.